United States Patent
Walk et al.

[11] Patent Number: 5,882,060
[45] Date of Patent: Mar. 16, 1999

[54] MOTOR VEHICLE SEAT

[75] Inventors: Hansjörg Walk, Reutlingen; Peter Groche, Kaiserslautern, both of Germany

[73] Assignee: Lear Corporation, Southfield, Mich.

[21] Appl. No.: 11,968
[22] PCT Filed: Jun. 13, 1997
[86] PCT No.: PCT/EP97/03091
§ 371 Date: May 26, 1998
§ 102(e) Date: May 26, 1998
[87] PCT Pub. No.: WO97/48570
PCT Pub. Date: Dec. 24, 1997

[30] Foreign Application Priority Data

Jun. 20, 1996 [DE] Germany ............... 196 24 587.7-14

[51] Int. Cl.⁶ .................................................. B60N 2/02
[52] U.S. Cl. ................................ 296/65.01; 296/65.02
[58] Field of Search ............................ 296/65.01, 65.02

[56] References Cited

U.S. PATENT DOCUMENTS

| | | | |
|---|---|---|---|
| 3,883,172 | 5/1975 | Barton et al. | 296/65.02 |
| 4,285,545 | 8/1981 | Protze | 296/65.01 |
| 4,793,583 | 12/1988 | Bergacker et al. | 296/65.01 |
| 5,272,633 | 12/1993 | Pietsch | 296/65.02 |
| 5,536,059 | 7/1996 | Amirouche | 296/65.02 |
| 5,812,399 | 9/1998 | Judic et al. | 296/65.01 |

FOREIGN PATENT DOCUMENTS

| | | |
|---|---|---|
| 0 401 092 A | 12/1990 | European Pat. Off. . |
| 1301910 A | 12/1969 | France . |
| 195 29 031 | 8/1995 | Germany . |

OTHER PUBLICATIONS

Patent abstract of Japan, vol. 11, No. 155 (M–589) [2602], 20.Mai 1987 & JP 61 285147 A (Kunimatsu Kogyo K.K.), Dec. 1986.

Primary Examiner—Joseph D. Pape
Assistant Examiner—Kiran Patel
Attorney, Agent, or Firm—Brooks & Kushman P.C.

[57] ABSTRACT

The invention relates to a motor vehicle seat with seat components (10, 12, 14) which are arranged so as to be movable relative to one another and which are adjustable by means of an adjusting device. Due to the fact that the movement state of the motor vehicle may be detected by means of a detection device, which causes the adjusting device to move, via individual actuators (22, 24, 26, 28, 30), at least one of the seat components (10, 12, 14) relative to the other seat components in such a way that, during the driving process, an alleviation of the load on the seat user occurs automatically, a motor vehicle seat is created which, in dependence on the respective state of motion, effects dynamic seat adjustment for the seat user and therefore alleviates the load on him.

22 Claims, 3 Drawing Sheets

MOTOR VEHICLE SEAT

The invention relates to a motor vehicle seat with seat components which are arranged so as to be movable relative to one another and which are adjustable by means of an adjusting device.

Seats along these lines are known in a large number of forms of embodiment. Thus, for example, from DE 1,580,621, DE 1,580,623 and DE 2,721,539 A1 motor vehicle seats are known with seat components which are adjustable via an adjusting device and which, when the motor vehicle is stationary, can be adapted to the shape of the body of the respective seat user. These seat components, adjusted in quasi-static state, retain their originally set position when the motor vehicle is in motion. The position of the seat occupant, however, alters if transverse or longitudinal accelerations occur. Thus on the basis of the mass inertia of the respective seat user when driving round curves, displacement of his weight to the side further away from the midpoint of the curve takes place. The result of this is, on the one hand deeper deflection of the seat user into the seat upholstery, and on the other hand an additional displacement of body tissues on this side.

Both these things tend to lead to tilting of the spinal column away from the curve midpoint. Where the level of the chassis is not controlled, it also tends in this direction. Since the seat user, especially the driver of the motor vehicle, may not, for reasons of safety, significantly change his relative position to the steering wheel, mirrors, doors, safety belt or pedals, he must try to maintain his position via usually considerable straining of his muscles and harmful bending of his spinal column around the longitudinal axis of the motor vehicle.

To remedy this, it has already been suggested that very defined side flaps on the seat cushions and rest as well as hard seat upholstery and spring systems should be provided as support. These additional support features can contribute to lessening of the muscle tension when the motor vehicle is in motion. A considerable lessening of the bending of the spinal column, however, cannot be achieved by these means. In addition to this, hard seat upholstery lessens the cushioning effect of the motor vehicle seat against vibration. Getting in and out of the motor vehicle is also hindered. The upholstery surfaces of the side flaps are exposed to extreme stress and when the motor vehicle is driving straight forward, freedom of movement and the removal of humidity are considerable reduced by the tightly fitting seat.

Proceeding from this state of the art, the object underlying the invention is to create a motor vehicle seat which, in dependence on the respective state of motion, causes dynamic adaptation of the seat for the user of the seat and thus alleviates the load on him. An object of this sort is achieved by a motor vehicle seat comprising the features of claim 1.

Because of the fact that, according to the characterising part of claim 1, the state of motion of the motor vehicle may be detected by means of a detection device, which causes an adjusting device, via individual actuators, to move at least one of the components of the seat in such a way relative to the other components that, during the driving process, the load on the seat user is automatically alleviated, there is a balance of the relative movement between seat and seat user caused by inertia, especially where acceleration forces occur in a longitudinal and transverse direction when the motor vehicle is in motion. Thus there is an acceleration-dependent adjustment of the seat contour with a slight alteration of the so-called comfort angle, and good lateral guiding is achieved without worsening the sitting conditions or limiting freedom of movement even at a constant speed.

With the motor vehicle seat according to the invention, it is possible always to activate those components of the seat which are needed to support the seat user against the influence of acceleration and therefore to alleviate the load on him. The other seat components can remain in their original position, nor do they restrict the respective seat user or hinder him when he is getting in and out of the motor vehicle. This results in dynamic and continuous adaptation of the seat in dependence on the acceleration forces occurring, wherein for the normal driving state which can be defined via threshold values which may be set in advance, the adjustable seat components return to their initial position, and then form a standard motor vehicle seat. The respective adjustment processes may be repeated in dependence on the driving state. By preference, a control unit takes over the control of the adjusting device. With the motor vehicle seat according to the invention, the seat user is relieved of acceleration forces and the resulting movements of motor vehicle and seat construction as well as bending of the body by an alteration in the seat contour.

Further advantageous developments of the motor vehicle seat according to the invention are the subject-matter of the sub-claims.

The motor vehicle seat according to the invention is described in greater detail below with reference to various embodiments, given by way of example, according to the drawing.

The following aspects are shown in the drawings as representations of principle and not to scale:

Figure 1:
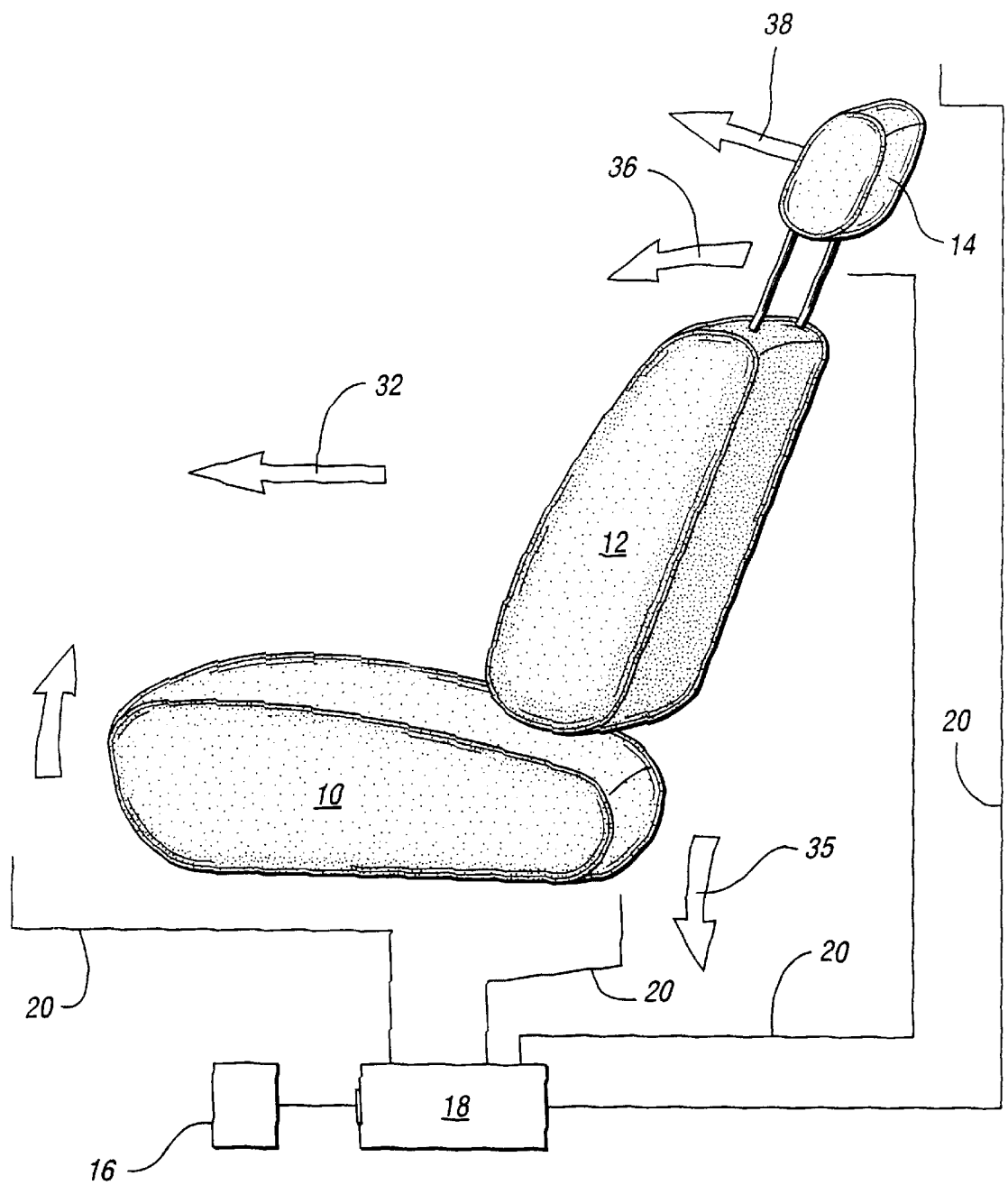
FIG. 1 is a motor vehicle seat offering the possibility of compensating acceleration.

The seat shown in schematic view in FIG. 1 has a standard seat portion 10 as well as a backrest 12 which may be adjusted in its inclination towards said seat portion, and which has on its upper side a headrest which may be adjusted both in height and in inclination and, if necessary, in its longitudinal position, the headrest 14 being capable of being controlled independently from the backrest 12, but also being able to be integrated in same as one piece. The respective seat components formed from the seat portion 10, the backrest 12 and the headrest 14 may be individually adjusted by means of an adjusting device which will be explained in greater detail below.

For the purposes of detecting forces acting on the motor vehicle seat, especially in the form of acceleration forces, there is an acceleration sensor 16 shown as a black box, which passes its measuring signals on to an evaluation unit 18, likewise shown as a black box and which in turn controls the adjusting device for the seat components. The control lines 20 needed for this between the evaluation unit 18 and the adjusting device are shown in schematic view. Both the acceleration sensor 16 and the evaluation unit 18 can be integrated individually or together in the respective motor vehicle seat and, when occasion arises, detect the inertia-related pressure forces if acceleration is brought about by the respective user of the seat in the seat. Instead of the acceleration sensor 16, a sensory device, not shown in greater detail, can be used, which for example detects the position of the steering wheel and the speed.

With each adjustable seat component 10, 12, 14 there are associated actuators or adjusting elements which are explained in greater detail with reference to various embodiments and which, as a portion of the adjusting device, undertake the adjustment in dependence on the state of motion of the motor vehicle, preferably in dependence on acceleration. Apart from continuous adaptation of the respective seat components 10, 12, 14 provided for this purpose in dependence on the motor vehicle acceleration which occurs and/or on the amount of the turning angle of the steering wheel and/or the speed, the seat components of this kind 10, 12, 14 are returned to an initial position by means of the adjustment device.

The individual actuators are servo-driven and are preferably formed from servo-motors 22, servo working cylinders (not shown), mechanical adjusting devices, such as coupled gears 24, cam and eccentric drives 26 or spring systems 28 with adjustable spring stiffness and/or adjusting chambers 30 of variable volume. As well as an electric drive concept for the adjusting device, the adjusting elements or actuators can also undertake the respective adjustment pneumatically or hydraulically. Where adjusting chambers 30 of variable volume are used, the adjusting device must react quickly to a change in volume so that the respective seat component can act straight away to compensate the acceleration force occurring. The maximum possible adjustment of the seat component towards the seat user is limited here and may preferably be set individually in advance.

If acceleration acts on the seat according to FIG. 1 and therefore on the seat user in the direction of the arrow 32, such as happens for example if brakes are applied to the relevant motor vehicle, but also as can occur during a reverse crash, the acceleration values related to this are detected by the acceleration sensor 16 and passed on to the evaluation unit 18 as a control device and therefore as part of the detection device. The latter, via the control lines 20, then controls the individual actuators of the adjusting device in such a way that, in the direction of the arrows 34 and 35, the seat portion 10 is adjusted at the front upwards and downwards at the back.

At the same time the backrest 12 together with the headrest 14 or independently of same is tilted forward in the direction of the arrow 36, the headrest, as indicated by the arrow 38, being able to undertake an independent adjusting movement controlled via the adjusting device. By this means, the seat user is held securely in his seat in his optimum driving position, is correspondingly supported by the seat and therefore relieved of acceleration forces. Since the free path from the headrest 14 to the head of the seat user is lessened by the adjustment undertaken, during the so-called "rebound" of the head, which can occur with considerable speed, the acceleration forces which occur are reduced and harmful damage in the head and in the throat and neck region are avoided.

When the influence of acceleration has ceased, which may likewise be detected via the acceleration sensor 16, the respective adjusting device puts the seat components 10, 12 and 14 back into their original position, via the individual actuators. Independently of this automatic dynamic adjustment capability of the actuated seat components, the possibility is provided for the seat user to adjust the seat according to his own requirements. Should the seat components 10, 12 and 14 be divided into segments, there also exists the possibility of the adjusting device effecting the adjustment of the relevant segment portions (not shown) of the seat independently of the respective state of motion, in the sense of a fine adjustment.

With reference to the embodiment according to FIG. 2, the seat portion of a motor vehicle seat which is not shown in detail is described below, on which seat the backrest (not shown) remains rigid and the seat portion 10 achieves alleviation of the load on the seat user if the associated motor vehicle drives through a curve.

Figure 2:
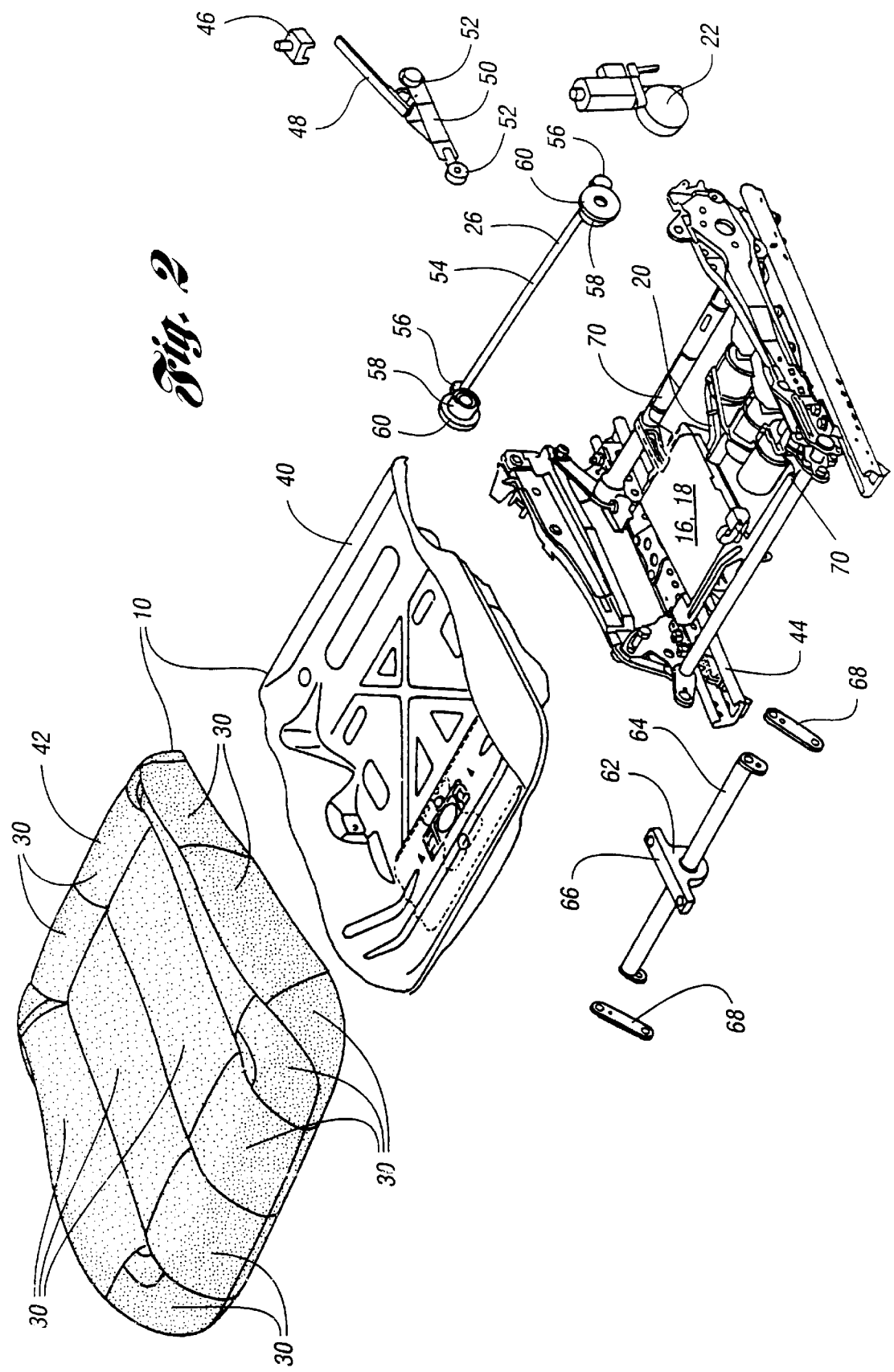
FIG. 2 is a first form of an embodiment of the motor vehicle seat with controllable seat portion, in the manner of an assembly drawing.

The seat portion 10 according to FIG. 2 has in standard construction a shell-like rigid seat upholstery carrier 40 made of metal, on which the seat upholstery 42 rests with its individual segments. The seat portion 10 assembled in this way is a component of a standard seat sub-frame 44 which allows longitudinal and height adjustment of the seat portion 10. The seat upholstery carrier 40 is supported along its two longitudinal sides at the rear, each on an engaging cam 46, which is arranged so as to be longitudinally displaceable along a leaf-spring 48 running in a straight line and preferably made of synthetic material. One end of the leaf-spring 48 is linked on to a swing-body 50 which is connected via its ends 52 in a conventional manner and therefore not described in greater detail, on the one hand with the seat sub-frame 44 and on the other hand with the seat upholstery carrier 40. The swing arrangement 50 with the leaf-spring 48 and the engaging cam 46, shown on the right looking at FIG. 2, is correspondingly provided for the opposite longitudinal side of the motor vehicle seat, but is omitted here to simplify the representation.

A cam or eccentric drive 26, co-operating with the servo-motor 22, is provided as individual actuators. The cam or eccentric drive 26 has a control shaft 54, which may be driven by the servo-motor 22 and has at each end a control wheel 56, especially in the form of a toothed wheel, which serves to drive eccentric cams 58 which are provided on their faces with a control surface 60, especially in the form of an additional toothed wheel. The cams 58 act on the leaf-springs 48. The two eccentric cams 58 are arranged in relation to one another in such a way as to guarantee that either the seat surface is running substantially horizontally, even in the rear region, or that alternately the one or the other rear end is raised or lowered via the respective cam or eccentric drive 26.

In order to support the rotation of the seat upholstery carrier 40, in the front region of the seat a ball joint 62 is arranged which may be swivelled not only round a link-rod 64 of the seat sub-frame 44 but rather may also be moved in a direction transverse to same. To initiate this movement, the ball joint 62 with a link point 66 is connected with the seat upholstery carrier 40 via an associated recess on the lower side of same.

When the motor vehicle is driven normally round a curve, provision is now made, either via accelerating sensors 16 to detect the acceleration forces on the motor vehicle or through a movement sensor to detect the turning angle of the steering wheel and/or the driving speed, for the evaluation unit 18 to control the associated servo-motor 22 via the respective electrical control line 20 in such a way that, outside the middle of the curve, the rear end region at the edge of the seat portion is raised via the associated control surface 58, and the neighbouring opposite edge region either remains in its position or is additionally lowered via the associated control surface 58. The front pivot point of the seat portion 10, on the other hand, remains, via the ball joint 62, in its vertical position and only the front edge region of the seat portion 10 leading away from there carries out a swivel movement.

In so far as the upholstery carrier 40 represents a variable shell, direct deformation of the seat shell and therefore of the seat portion upholstery 42 via the individual actuators is also possible. A differentiated control system in this respect for the seat portion 10 is also produced if the seat portion upholstery 42 is assembled with adjusting chambers 30 of variable volume and if the latter are filled or emptied via a suitable adjusting device with a medium, for example a liquid or gas. As well as direct control of the swing-body 50, a correspondingly configured eccentric drive (not shown) could also engage in the longitudinal direction of the respective leaf-spring 48 on to said spring and thus alter its stiffness in such a way that the desired acceleration-determined adjustments are made. With the motor vehicle seat described in FIG. 2, compensation of the tilting is achieved via the opposite inclination of the seat portion 10 and the lumbar vertebrae region of the seat user is kept in a straight line resulting in greater comfort for him.

Figure 3:
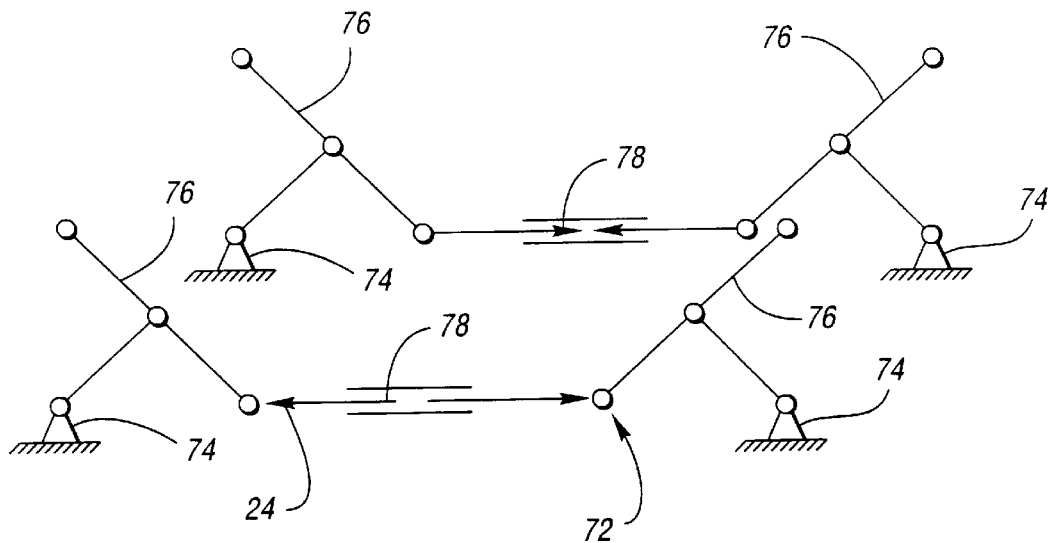
FIGS. 3 and 4 are modified forms of embodiments of the motor vehicle seat claimed.

Instead of the solutions indicated above, the adjusting device according to the schematic view of FIG. 3 can also be formed from a slider-crank mechanism 72 with four-point bearing 74. Serving as individual activators for this special coupled gear 24, are the coupling elements 76 which are arranged so as to be pivotable around the bearings 74 and which can engage with their free ends for example on the lower side of the seat portion 10, at its corners. Spindles 78 which may be driven in translatory fashion serve as drive for this special slider-crank mechanism. With the solution along these lines, it is also possible simultaneously to raise the seat portion along one longitudinal side to the same horizontal plane and, on the other hand, to lower it on the opposite side. Thus a tilting movement around a longitudinal axis of the seat portion 10, remaining at the same height, is possible, whereas with the embodiment according to FIG. 2, the longitudinal axis is tilted in the direction of the motor vehicle pedals in relation to a hypothetical horizontal plane.

Figure 4:
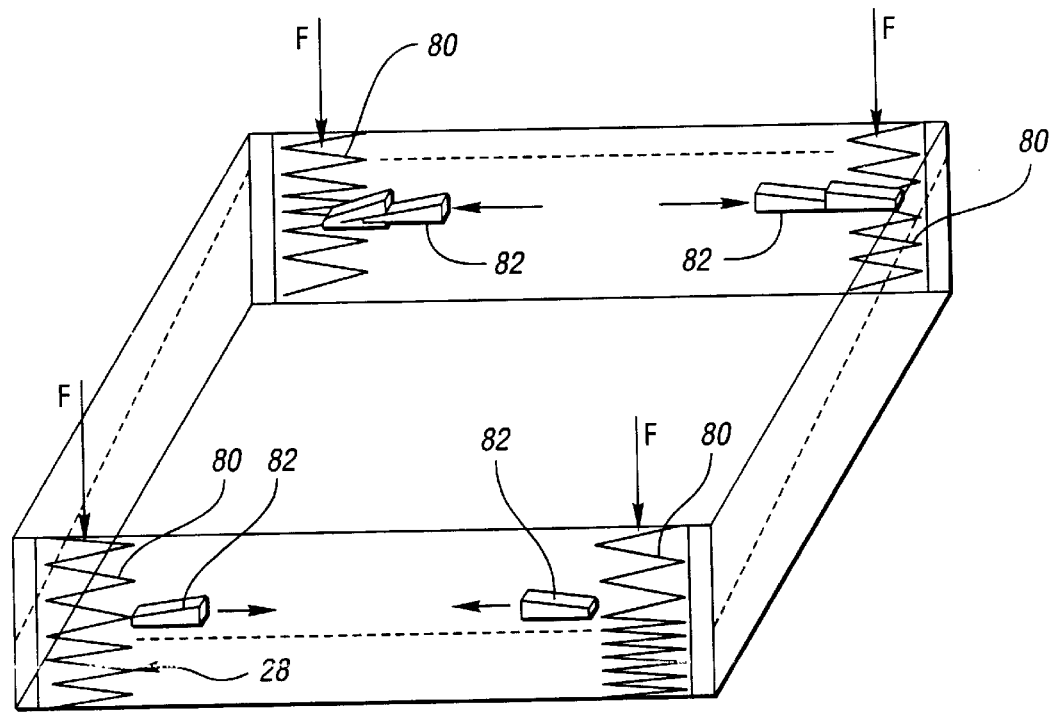

In the embodiment according to FIG. 4, a spring system is realised, indicated as a whole by 28, with individual springs 80 arranged at the corners of the seat upholstery carrier 40, on its lower side, to which springs a force F may be applied in a direction from the seat portion 10. In this embodiment, too, a detection device detects the state of motion of the motor vehicle and causes the adjusting device, this time via push-in wedges 82, to alter the stiffness of the springs 80. If the stiffness of the individual springs 80 is enlarged in dependence on the given acceleration conditions by being pushed in, there is less lowering of the individual actuator under the respective load. In the initial state, provision is here made for the stiffness of the springs on the front edge of the seat to be smaller on the basis of its smaller load than in the rear portion of the seat part 10.

The adjusting devices, relating above predominantly to the seat portion 10, do not need to be limited here to same, but rather can also be used for the backrest 12, either in addition or alternatively. With the motor vehicle seat according to the invention, it is therefore possible for the first time, in dependence on the state of acceleration or motion of the motor vehicle, to realise dynamic adaptation of the seat for the seat user and thus to alleviate the load on him, account being taken at the same time of today's restricted space inside motor vehicles. If, for example, the adjustment steps only affect the seat portion whilst the backrest remains static, twisting of the seat is possible to alleviate the load on the person in the motor vehicle, without the latter or the motor vehicle seat bumping against door trim panels, B-columns or tunnels.

Apart from the already-mentioned sensors, other sensors can also be used, for example mat-like pressure sensors which are accommodated in the motor vehicle seat and detect the seating state of the seat user as determined by movement.

We claim:

1. A vehicle seat assembly for a motor vehicle, comprising:

an adjusting device;

a detection device;

at least one actuator; and a plurality of seat components movable relative to one another and adjustable by means of the adjusting device, wherein a state of motion of the motor vehicle is detectable by means of the detection device which causes the adjusting device to control, via the at least one actuator, a selected one of the seat components relative to another seat component such that a load on a seat user is alleviated.

2. The vehicle seat assembly according to claim 1 wherein control of the selected seat component is a function of acceleration of the motor vehicle.

3. The vehicle seat assembly according to claim 1 wherein control of the selected seat component is a function of the turning angle of a steering wheel.

4. The vehicle seat assembly according to claim 1 wherein control of the selected seat component is a function of the speed of the motor vehicle.

5. The vehicle seat assembly according to claim 1 wherein the adjusting device returns the selected seat component to an initial position.

6. The vehicle seat assembly according to claim 1 wherein the selected seat component comprises a seat portion.

7. The vehicle seat assembly according to claim 1 wherein the selected seat component comprises a backrest.

8. The vehicle seat assembly according to claim 1 wherein the selected seat component comprises a headrest.

9. The vehicle seat assembly according to claim 1 wherein the detection device includes an acceleration sensor.

10. The vehicle seat assembly according to claim 1 wherein the detection device includes a sensor to detect a turning angle of a steering wheel.

11. The vehicle seat assembly according to claim 1 wherein the actuator is servo-driven.

12. The vehicle seat assembly according to claim 1 wherein the actuator comprises a servo-motor.

13. The vehicle seat assembly according to claim 1 wherein the actuator comprises a servo-working cylinder.

14. The vehicle seat assembly according to claim 1 wherein the actuator comprises a mechanical adjusting member.

15. The vehicle seat assembly according to claim 1 wherein the actuator comprises coupled gears.

16. The vehicle seat assembly according to claim 1 wherein the actuator comprises cam and eccentric drives.

17. The vehicle seat assembly according to claim 1 wherein the actuator comprises a spring system with adjustable spring stiffness.

18. The vehicle seat assembly according to claim 1 wherein the actuators comprise spring systems with adjusting chambers of variable volume.

19. The vehicle seat assembly according to claim 1 wherein when a transverse movement in a curve direction occurs, the adjusting device controls the selected seat component which lies on the outside in the direction of the curve.

20. The vehicle seat assembly according to claim 1 wherein when a transverse movement in a curve direction occurs, the adjusting device controls the height of the selected seat component.

21. The vehicle seat assembly according to claim 1 wherein parameters of the movement of the selected seat component may be adjusted individually by the seat user.

22. The vehicle seat assembly according to claim 1 wherein the adjusting device may be manually operated.

* * * * *